United States Patent

Moss, III et al.

[11] Patent Number: 6,025,677
[45] Date of Patent: Feb. 15, 2000

[54] BLUE LIGHT EMITTING THIOGALLATE PHOSPHOR INCLUDING A THIN NUCLEATION LAYER OF STRONTIUM SULFIDE

[75] Inventors: Thomas S. Moss, III, Santa Fe; Robert C. Dye, Los Alamos, both of N.Mex.

[73] Assignee: The Regents of the University of California, Los Alamos, N.Mex.

[21] Appl. No.: 08/837,072

[22] Filed: Apr. 11, 1997

[51] Int. Cl.⁷ .................................................. H05B 33/00
[52] U.S. Cl. .......................... 313/503; 313/504; 313/506; 313/509; 313/498
[58] Field of Search ...................... 313/503, 506, 313/509, 504, 512, 511, 502, 498

[56] References Cited

U.S. PATENT DOCUMENTS

| | | | |
|---|---|---|---|
| 5,581,150 | 12/1996 | Rack et al. | 313/506 |
| 5,598,059 | 1/1997 | Sun et al. | 313/503 |
| 5,677,594 | 10/1997 | Sun et al. | 313/509 |

Primary Examiner—Nimeshkumar D. Patel
Assistant Examiner—Joseph Williams
Attorney, Agent, or Firm—Bruce H. Cottrell

[57] ABSTRACT

An electroluminescent device including a glass substrate, a transparent conductor layer, a dielectric layer, a nucleation layer, and a phosphor material is provided with the nucleation layer being a layer of strontium sulfide.

12 Claims, 3 Drawing Sheets

BLUE LIGHT EMITTING THIOGALLATE PHOSPHOR INCLUDING A THIN NUCLEATION LAYER OF STRONTIUM SULFIDE

FIELD OF THE INVENTION

The present invention relates to flat panel displays and to thin film electroluminescent displays. More particularly, the present invention relates to a layered substrate for subsequent chemical vapor deposition of phosphor material, and to thin film devices prepared with such a layered substrate in a chemical vapor deposition process. This invention is the result of a contract with the Department of Energy (Contract No. W-7405-ENG-36).

BACKGROUND OF THE INVENTION

Displays are a critical technology for the nation; they are the primary means by which people receive information from machines, ranging from computer screens to hospital monitors to head-mounted displays. Increasingly, flat panel displays (FPDs) are becoming more important for meeting military and civilian application requirements. Such FPDs are, both literally and figuratively, windows into today's information age. However, current display technologies are limited by their range of sizes, power consumption, lifetime, robustness, and operational conditions. A variety of different size FPDs are urgently needed that are lightweight and economical while having lower power consumption and higher resolutions. Future information systems, both military and civilian, will become increasingly constrained by the availability and performance of their display interfaces.

Two major problems plague phosphors in use in display technologies. The first is the inability to produce phosphor materials with sufficient stability and longevity to satisfy the lifetime requirements of a display. The second problem is the inability to prepare phosphors that emit red, green and blue light with sufficient brightness to satisfy luminance requirements for ease of viewing.

The development of thin film phosphors has been seen as one solution to the current limitations of existing phosphors. Phosphor materials in thin film form offer several distinct advantages over the conventional powder phosphor screens. Fully dense phosphor films have less surface area and outgas less than powder phosphors. Typically, thin film phosphors have smaller grain sizes than conventional powder phosphor materials. The smaller grain size provides a smaller spot size and correspondingly higher resolution. Because the film is fully dense and in intimate contact with the underlying substrate, thin film phosphors transfer heat more effectively than conventional porous powder phosphors. This allows the thin film device to be driven at higher power levels, and therefore produce higher luminance. Thin film phosphors can also rely on the experience of the microelectronics industry for the efficient scale up of the deposition processes to commercial levels.

Further improvements in the phosphor brightness, chromaticity, efficiency, and turn-on voltage have been sought through improvement of the deposition process for the phosphor materials, especially by deposition processes achieving low temperature growth of crystalline-as-deposited materials. Previously, deposition techniques for thin film phosphors relied on physical vapor deposition techniques such as sputtering, multi-source evaporation, or molecular beam epitaxy. These techniques are typically slow and produce amorphous films requiring an extra step of a post-deposition anneal. Also, such depositions can suffer from large defect densities because of the volatility of some of the constituents or because of thermal instability of the phosphor.

The development of low temperature metal-organic chemical vapor deposition (MOCVD) for the growth of thin film phosphors was a significant advancement in the area of thin film phosphors. The low temperature (<600° C.) MOCVD of crystalline-as-deposited alkaline earth thin film phosphors (cerium-doped calcium thiogallate) has recently been demonstrated. This material showed photoluminescence, cathodoluminescence, and electroluminescence. An electroluminescence brightness of over 7.5 cd/m$^2$ at a drive frequency of 60 Hz with approximately a 40 V reduction in the threshold voltage has been observed for the MOCVD CaGa$_2$S$_4$:Ce approaching the highest reported value for sputtered CaGa$_2$S$_4$:Ce of 10 cd/m$^2$. However, the sputter deposited materials require a thermal anneal after deposition at temperatures in excess of 650° C. This extra annealing step limits the usable substrate glasses to high temperature varieties. The extra step and the necessity of high temperature glasses add significantly to the cost of any subsequent device.

Further improvement of Ce-activated alkaline earth thiogallates is desired for EL devices to become fully utilized. Present state of the art full color EL displays use sputtered CaGa$_2$S$_4$:Ce as the blue phosphor. This material has a luminance of 10 cd/m$^2$, compared to 54 cd/m$^2$ for the red (ZnS:Mn with a color filter) and to 43 cd/m$^2$ for the green (ZnS:Tb). As a result of the relative dimness of the blue material, a higher fill factor is needed to provide a brightness that is agreeable to the human eye. In one present EL device, the CaGa$_2$S$_4$:Ce has a fill factor of 48%, meaning that almost half of the full color pixel is composed of the blue phosphor. Thus, the ultimate resolution of the display is limited by the brightness of the blue phosphor because it defines the amount of material necessary to make up the pixel. Further, from a manufacturing prospective, the use of large amounts of CaGa$_2$S$_4$:Ce is not desirable because of the high cost from the expensive starting materials, extra processing steps, and the high temperature glass.

It is an object of this invention to provide an increase in brightness in blue phosphor emission.

It is a further object of this invention to provide an increase in brightness in blue phosphor emission without effecting the chromaticity of the blue color emission.

Yet a further object of this invention is to provide an improved substrate for subsequent MOCVD deposition of a phosphor especially of a blue phosphor such as CaGa$_2$S$_4$:Ce.

A still further object of the present invention is to allow for the MOCVD deposition of the required phosphors with increase brightness but without the need for a subsequent high temperature anneal requiring the use of a special high temperature glass.

SUMMARY OF THE INVENTION

To achieve the foregoing and other objects, and in accordance with the purposes of the present invention, as embodied and broadly described herein, the present invention provides in an electroluminescent device including a glass substrate, a transparent conductor layer directly upon the glass substrate, a dielectric layer directly on the transparent conductor layer, a nucleation layer directly upon the dielectric layer, and a phosphor material directly upon the nucleation layer, the improvement wherein said nucleation layer is a layer of strontium sulfide.

The present invention further provides a process of improving brightness in blue phosphor emission by depositing a Ce-activated alkaline earth thiogallate phosphor on a substrate including a glass substrate, a transparent conductor layer directly upon the glass substrate, a dielectric layer directly on the transparent conductor layer, and a nucleation layer of strontium sulfide directly upon the dielectric layer.

DETAILED DESCRIPTION

The present invention concerns the substrate arrangement for subsequent MOCVD of phosphor materials in EL devices.

In the devices according to the present invention, an alternating current thin film electroluminescent panel can include sets of orthogonally disposed top and bottom electrode layers sandwiching an electroluminescent laminate which includes an electroluminescent phosphor layer sandwiched between at least a pair of insulators.

The electroluminescent phosphor layer is preferably of a group II metal thiogallate with a rare earth dopant. The general chemical formula is $RGa_2S_4:Ce$, where R is selected from the group of magnesium, calcium, strontium, barium or zinc, preferably calcium, strontium and barium. Cerium (Ce) serves as an activator dopant. For blue emission in a thin film electroluminescent device, cerium is the preferred activator dopant. For other color emissions, other activator dopants such as europium or terbium may be used. The activator dopant is generally added to the group II metal thiogallate in amounts of from about 1 to about 10 atomic percent, preferably from about 2 to about 8 atomic percent.

Figure 1:
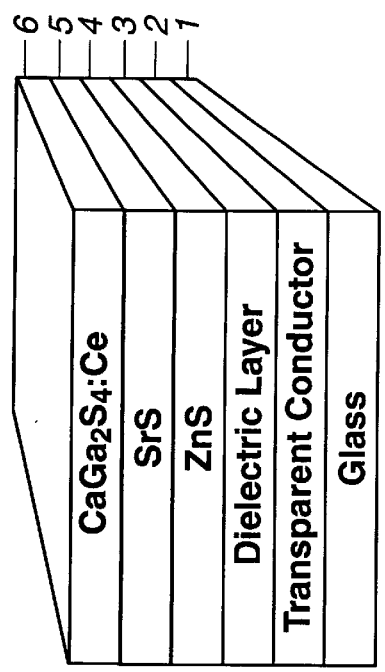
FIG. 1 is a side view of a substrate arrangement of the present invention for the subsequent deposition of crystalline thiogallate phosphor.

A thin film electroluminescent panel in accordance with the present invention is shown in FIG. 1 and includes a glass substrate 1 which supports a transparent conducting material such as indium tin oxide (ITO) electrode layer 2. Deposited on top of this electrode layer is a layer of a dielectric material 3 such as barium tantalate ($BaTa_2O_6$), strontium titanate ($SrTiO_3$), a multilayer structure of $Al_2O_3$ or $TiO_2$ (($Al_2O_3$/$TiO_2$) including several layers to make up the desired thickness, such multilayer dielectric hereinafter referred to as ATO) or barium titanate ($BaTiO_3$), the layer of dielectric material generally having a thickness of around 3000 Å. A layer 5 of strontium sulfide (SrS) which is between 100 Å and 500 Å thick is deposited on top of the dielectric layer. In one embodiment, a first layer 4 of zinc sulfide (ZnS) which is between 100 Å and 500 Å thick is deposited on top of the dielectric layer 5 with a layer of strontium sulfide (SrS) which is between 100 Å and 500 Å thick is deposited on top of the ZnS. Next, a layer 6 of the desired thiogallate phosphor or phosphors can be deposited atop this SrS layer. The thiogallate phosphor layer is preferbly formed by chemical vapor deposition from metallo-organic or organometallic precursors. The thiogallate layer can be covered with a thicker layer of strontium sulfide or zinc sulfide between about 1000 Å to about 2000 Å thick. Preferably, no second layer of sulfide material is needed. A second dielectric insulator layer about 3000 Å thick is placed atop the top sulfide layer or atop the phosphor material. A top rear electrode layer is generally formed of electrodes made of aluminum.

Figure 5:
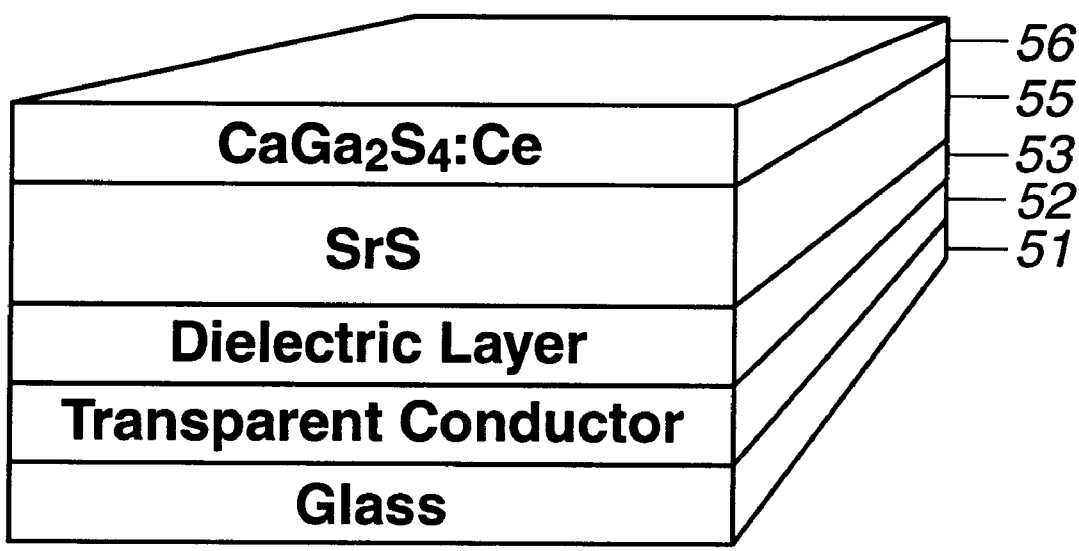
FIG. 5 is a side view of a substrate arrangement of the present invention for the subsequent deposition of crystalline thiogallate phosphor.

An embodiment of a thin film electroluminescent panel in accordance with the present invention is shown in FIG. 5 and includes a glass substrate 51 which supports the transparent conducting material 52 such as an ITO electrode layer. Deposited on top of this electrode layer is a layer of the dielectric material 53, the layer of dielectric material generally having a thickness of around 3000 Å. A layer of strontium sulfide 55 which is between 100 Å and 500 Å thick is deposited on top of the dielectric layer. Next, a layer 56 of the desired thiogallate phosphor or phosphors can be deposited atop this SrS layer. The thiogallate phosphor layer is preferably formed by chemical vapor deposition from metallo-organic or organometallic precursors. As in the prior embodiment, the thiogallate layer can be covered with a thicker layer of strontium sulfide or zinc sulfide between about 1000 Å and 2000 Å thick. Preferably, no second layer of sulfide material is needed.

By "metallo-organic" is meant a material including a metal atom and organic ligands but without any metal-carbon bonds. By the term "organometallic" is meant a material including a metal atom and organic ligands and with at least one metal-carbon bond. Generally, either type of precursor, i.e., an organometallic precursor or a metallo-organic precursor, including the necessary metal atom can be used in practicing the present chemical vapor deposition.

A chemical vapor deposition (CVD) technique is preferably used to deposit the thiogallate phosphor layer. The chemical vapor deposition process basically requires the simultaneous deposition of $Ga_2S_3$ and CaS, together with the cerium dopant. $Ga_2S_3$ can be deposited from an organometallic precursor such as triethyl gallium or a metallo-organic precursor such as gallium tris-tetramethyl heptandionate ($Ga(TMHD)_3$) in an atmosphere of a sulfur source such as $H_2S$ while CaS can be deposited from an metallo-organic precursor such as calcium bis-tetramethyl heptandionate ($Ca(TMHD)_2$) in an atmosphere of $H_2S$. Cerium can be deposited from an metallo-organic precursor such as cerium tetrakis-tetramethyl heptandionate ($Ce(TMHD)_4$). Similarly, other metals such as barium and strontium may be deposited from metallo-organic precursors such as barium bis-tetramethyl heptandionate ($Ba(TMHD)_2$) and strontium bis-tetramethyl heptandionate ($Sr(TMHD)_2$).

The chemical vapor deposition is generally conducted at low substrate temperatures, i.e., at temperatures from about 400° C. to about 600° C., preferably from about 550° C. to about 600° C. With deposition of as deposited crystalline thiogallate phosphor at these substrate temperatures, ordinary glass substrates having low melting temperatures can be used in addition to high temperature glass substrates such as quartz. By "ordinary glass" is meant glass that has a strain point or warps at temperatures of greater than about 600° C., for example, a glass such as Corning 7059 glass.

The strontium sulfide layer is of special importance. The critical function of the SrS layer is to provide a nucleation surface. The ideal thickness of the SrS layer upon which the phosphor material is deposited can generally range from about 100 Å to about 500 Å. If the layer is too thick there can be an excessive rise in the threshold voltage.

The group II metal thiogallates are generally low electroluminescent efficiency phosphors. Thus, a high dielectric insulator such as 3000 Å of ATO can be used to increase charge injection and to allow the use of a thicker phosphor layer without excessive increase in the operating voltage. To fully cover the phosphor layer, any ATO layer must generally be thicker than about 2500 Å to avoid breakdown at thin spots. In addition to ATO, other high dielectric materials such as a strontium titanate/zirconate mixture can be used to achieve the same result.

In one embodiment, the structure for a thin film electroluminescent device blue-emitting device includes a glass substrate which supports a transparent electrode layer made of indium tin oxide (ITO). The substrate is then coated with an insulator film such as ATO, which is coated with a layer of strontium sulfide. Alternatively, the insulator layer is first coated with a layer of zinc sulfide and then with a layer of strontium sulfide. An electroluminescent layer of calcium, strontium or barium thiogallate, the respective thiogallate doped with cerium (preferably $CaGa_2S_4$:Ce) is coated onto the sulfide layer atop the insulator film layer. Finally, an insulator layer and a metallic contact are deposited upon the phosphor layer.

In another embodiment, the structure for a thin film electroluminescent device blue-emitting device includes a glass substrate which supports a transparent electrode layer made of indium tin oxide (ITO). The substrate is then coated with an insulator film such as ATO. An electroluminescent laminate comprising a layer of calcium, strontium or barium thiogallate, the respective thiogallate doped with cerium (preferably $CaGa_2S_4$:Ce) sandwiched between two layers of SrS is placed atop the insulator film layer such as ATO.

In still another embodiment, the structure for a thin film electroluminescent device blue-emitting device includes a glass substrate which supports a transparent electrode layer made of indium tin oxide (ITO). The substrate is then coated with an insulator film such as ATO, which is coated with a layer of strontium sulfide. A bilayer of phosphor may then be used to obtain greater intensity, such a bilayer including a layer the desired thiogallate doped with cerium (preferably $CaGa_2S_4$:Ce), a layer of insulator material such as ATO and a second layer of the desired thiogallate placed atop the layer of strontium sulfide. Finally, an insulator layer and a metallic contact are deposited upon the top phosphor layer.

Alternatively, a conductive layer such as ITO or aluminum could be deposited on, e.g., silicon, then a layer of ATO, then a layer of ZnS, then a layer of SrS, then a layer of the phosphor, then a layer of ATO, then another ITO as a transparent top electrode through which the phosphor could emit.

In addition to a blue emission AC thin film electroluminescent device, a green emission may be produced by substituting europium (Eu) dopants for cerium (Ce) dopants.

Figure 2:
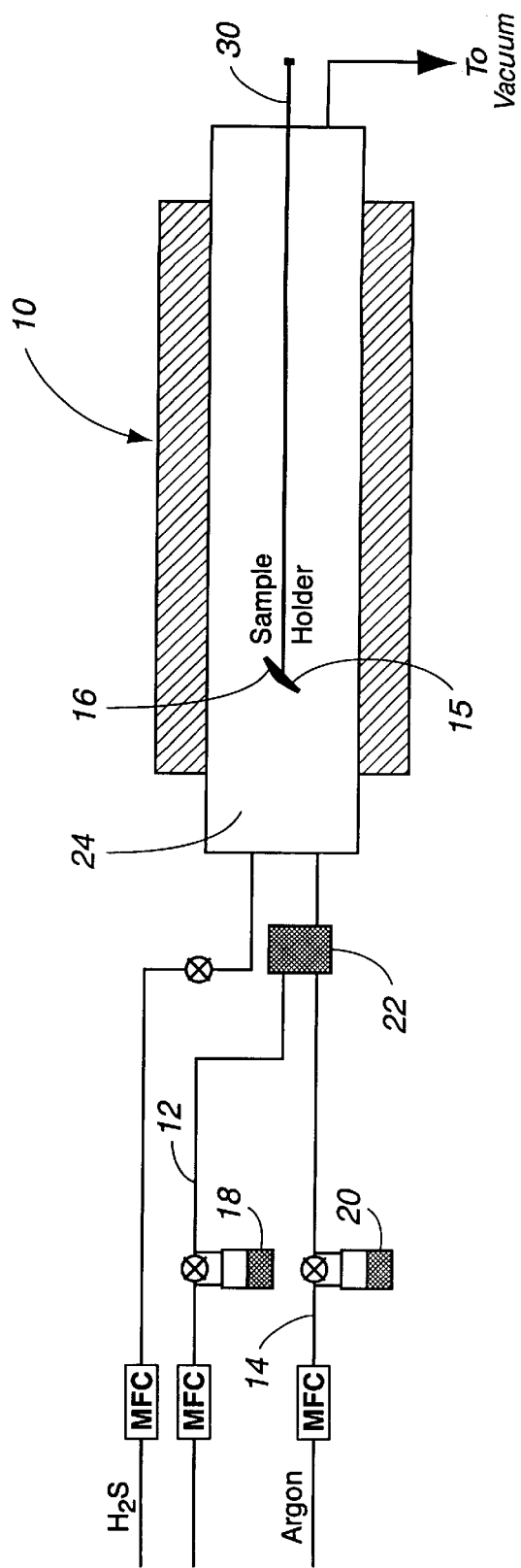
FIG. 2 is a schematic diagram of an apparatus used in the chemical vapor deposition process of the present invention.

Among the reactors useful in the deposition process are included two separate CVD reactors, each of a warm wall—hot stage configuration. The first type reactor is shown in FIG. 2 and is a horizontal tube reactor 10 with parallel gas flow at 12 and 14 to the substrate 16. The reactor is preferably built completely of stainless steel (for compatibility with $H_2S$ and moderately high temperatures) with appropriate fittings such as Con-flat, VCR, and Swagelok. Each precursors and a carrier gas such as argon or helium are passed from a separate bubbler (bubblers 18 and 20 are shown) into a stainless steel mixing chamber 22 and finally into the deposition chamber 24 where the mixture is interdiffused with incoming $H_2S$ as a sulfur source. Alternatively, the precursors and the carrier gas can be mixed with the $H_2S$ prior to entry into the deposition chamber. The gas inlets are coaxial with the deposition chamber. The reactor is fitted with a load-lock arrangement downstream of the deposition chamber to allow transfer of samples without venting the reactor to air. The equipment can also be fitted with a bypass which allows the precursor/carrier gas mixture to be pumped directly out of the system and not into the deposition chamber. The substrate stage 15 can consist of a stainless steel block and preferably positions the substrate approximately 30 degrees off parallel to the gas flow. The substrate stage 15 can contain a thermocouple and cartridge heaters. The substrate stage 15 is supported and transported to the load-lock via a stainless steel rod 30. The whole system can be evacuated by a rotary vacuum pump and reactor pressure can be regulated via a butterfly valve controller.

A second type reactor is a radiant heat reactor system with parallel gas flow to the substrate. The reactor can include a quartz window for allowing the radiant heat into the system from, e.g., a quartz-halogen lamp. Each precursors and the carrier gas such as argon or helium are passed from a separate bubbler into a stainless steel mixing chamber 54 and finally into where it is interdiffused with incoming $H_2S$. Again, the precursors and the carrier gas can be mixed with the $H_2S$ prior to entry into the deposition chamber.

The present invention is more particularly described in the following examples which are intended as illustrative only, since numerous modifications and variations will be apparent to those skilled in the art. The samples were characterized for chemical composition, and microstructure by x-ray fluorescence (XRF), x-ray diffraction (XRD), scanning electron microscopy (SEM) and transmission electron microscope (TEM). Where possible, EL spectra were taken to determine the color and brightness of the emission. XRF was done on a Tracor unit, while XRD was performed using a Rigaku Rotoflex rotating anode tube using Cu K-alpha radiation at an incident angle of 20° and an Inel CPS 120 position sensitive detector. SEM was done on a Hitachi S-4200, and a Jeol 2010 was used for TEM micrographs of sample cross-sections.

EXAMPLE 1

The deposition of a $CaGa_2S_4$:Ce phase was done using mixtures of $Ca(tmhd)_2$, $Ga(tmhd)_3$, $Ce(tmhd)_4$, and $H_2S$. The reagent delivery was performed using a liquid delivery system from Advanced Technology Materials, Inc., model LDS-300B. A description of the reagent delivery system is found in MOCVD of Electronic Ceramics II, Moss et al., pp. 21–29, Material Research Society (1996), such description hereby incorporated by reference. Depositions were done at a temperature of 582° C. and at a pressure of 5 Torr. The substrates were glass slides with deposited conductive, dielectric, and nucleation layers. Two types of nucleation layers were used. First, a layer of ZnS, and second a bilayer with a layer of SrS deposited upon a layer of ZnS. These arrangements were subsequently fashioned into a device by the deposition of a top dielectric layer and metallic contact whereupon electroluminescent measurements were made on the as-deposited materials.

The choice for substrate surface was SrS. The change in the nucleation behavior was quite dramatic when the SrS substrates were used, as observed in comparison of x-ray diffraction patterns. XRD patterns were taken on two samples deposited under identical conditions, with the only difference being in the substrate surface used. The SrS surface showed an increase in the count rate of the 400

CaGa$_2$S$_4$ peak of a factor of 14 times over that observed from the ZnS surface. While not wishing to be bound by the present explanation, it is believed that this increase is attributable to either an increase in the crystallinity of the grains or to a reduction in the porosity of the deposition. Cross-sectional TEM micrographs showed a reduced amount of porosity in the SrS film. This observation was attributed to the reduced interfacial energy between the nucleus and the substrate which led to an increased nucleation rate. Further, there did not appear to be the large amount of amorphous deposition which was observed in the deposition onto ZnS.

Figure 3:
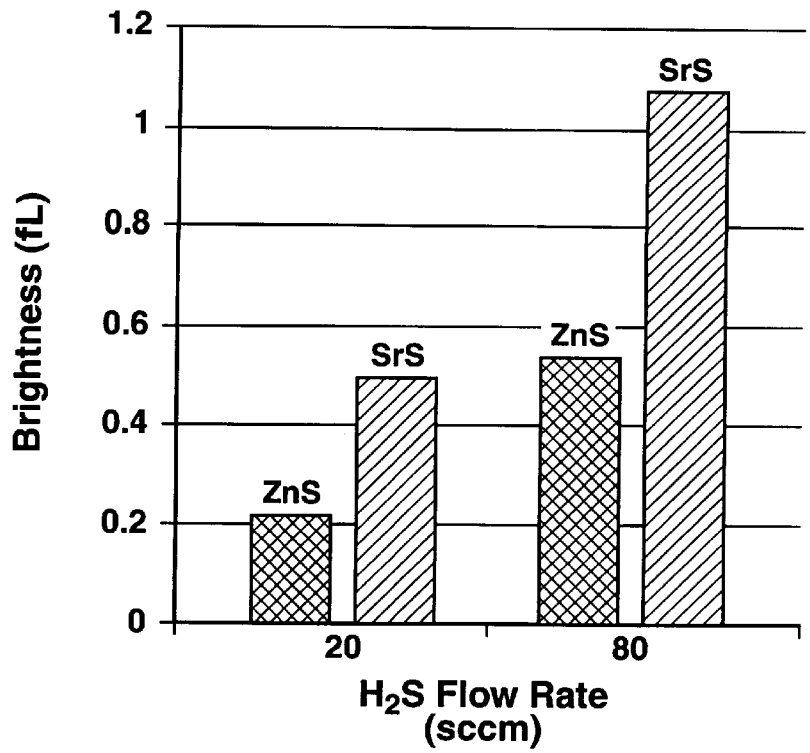
FIG. 3 shows a plot of phosphor brightness for nucleation layers of zinc sulfide and strontium sulfide at varying flow rates during deposition.
Figure 4:
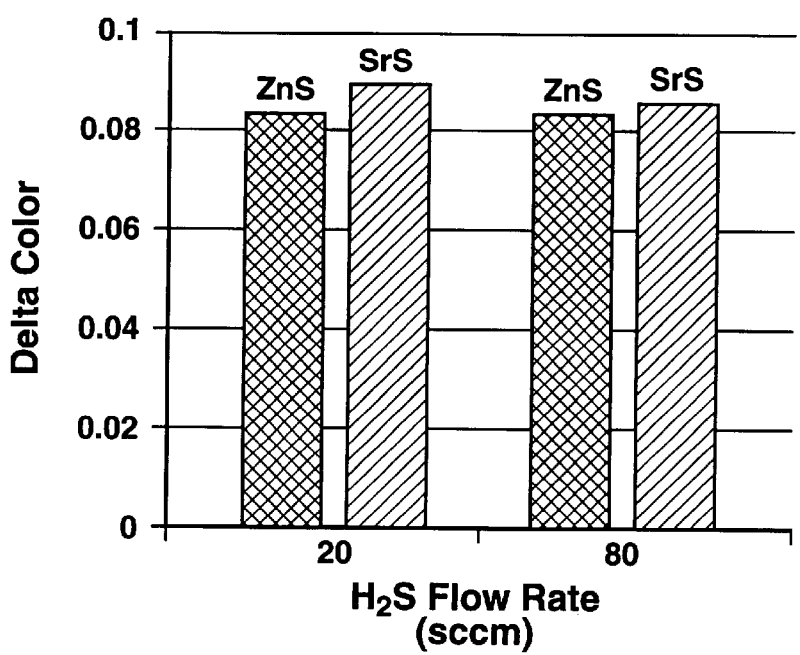
FIG. 4 shows a plot of phosphor chromaticity in units of delta color for nucleation layers of zinc sulfide and strontium sulfide at varying flow rates during deposition.

The EL of these two types of samples (ZnS and SrS) was expected to show an increase in the brightness which would correspond to the increased crystallinity and reduced porosity. A comparison of the brightness and color for two samples, one deposited on ZnS surfaces and the other on SrS surfaces, is shown in FIGS. 3 and 4. From this comparison, it is possible to see that moving to the SrS surface resulted in an increase in the brightness by a factor two. The color of the EL emission, was quantitatively measured in the Delta Color value, which is defined as:

$$Delta\ Color = \sqrt{(CIE_x - 0.15)^2 + (CIE_y - 0.20)^2}$$

where $CIE_x$ and $CIE_y$ are the measured values of the emission color. For an ideal blue color, the $CIE_x$ and $CIE_y$ should be 0.15 and 0.20, respectively. As can be seen in FIG. 4, the value of Delta Color did not change significantly between the pair of samples. This would indicate that the quality of the CaGa$_2$S$_4$:Ce did not change by switching from the ZnS surface to the SrS surface. This result is significant in that it indicates that the SrS layer improved the nucleation behavior of the CaGa$_2$S$_4$:Ce without influencing the deposition chemistry, i.e., without creating a SrGa$_2$S$_4$:Ce and/or a Sr,Ca$_{1-x}$Ga$_2$S$_4$:Ce phase. Therefore, direct changes in the brightness can be attributed to improvement of the CaGa$_2$S$_4$:Ce phase.

With these results, it is possible to see that dramatic improvement is possible in the performance of the deposited phosphors by manipulating the substrate material. The demonstrations of thin film phosphors from low temperature MOCVD processing represent a significant improvement and advancement for FPD technologies.

Although the present invention has been described with reference to specific details, it is not intended that such details should be regarded as limitations upon the scope of the invention, except as and to the extent that they are included in the accompanying claims.

What is claimed is:

1. In an electroluminescent device including a glass substrate, a transparent conductor layer directly upon the glass substrate, a dielectric layer directly on the transparent conductor layer, a single nucleation layer directly upon the dielectric layer, said nucleation layer having a thickness of from about 100 to about 500 Angstroms, and a phosphor material directly upon the single nucleation layer, the improvement wherein said nucleation layer is a layer of strontium sulfide.

2. The electroluminescent device of claim 1 wherein said phosphor material includes CaGa$_2$S$_4$:Ce.

3. The electroluminescent device of claim 2 wherein said phosphor material includes CaGa$_2$S$_4$:Ce.

4. The electroluminescent device of claim 1 wherein said phosphor material includes CaGa$_2$S$_4$:Ce and said CaGa$_2$S$_4$:Ce phosphor material is deposited by metallo-organic chemical vapor deposition.

5. A process of providing improved brightness to a blue phosphor in an electroluminescent device comprising depositing a single nucleation layer of strontium sulfide having a thickness from about 100 to about 500 Angstroms and depositing a blue phosphor material directly upon the layer of strontium sulfide.

6. The process of claim 5 wherein said phosphor material includes CaGa$_2$S$_4$:Ce.

7. The process of claim 5 wherein said phosphor material includes CaGa$_2$S$_4$:Ce and said CaGa$_2$S$_4$:Ce phosphor material is deposited by metallo-organic chemical vapor deposition.

8. An electroluminescent device comprising:
   a glass substrate;
   a transparent conductor layer directly upon the glass substrate;
   a dielectric layer directly on the transparent conductor layer;
   a single nucleation layer of strontium sulfide directly upon the dielectric layer, said strontium sulfide having a thickness of from about 100 to about 500 Angstroms; and,
   a phosphor material directly upon the single nucleation layer.

9. The electroluminescent device of claim 8 wherein said phosphor material includes CaGa$_2$S$_4$:Ce.

10. The electroluminescent device of claim 8 wherein said glass substrate has a strain point or warping temperature of less than about 600° C.

11. The electroluminescent device of claim 8 wherein said dielectric layer is ATO.

12. In an electroluminescent device including a glass substrate, a transparent conductor layer directly upon the glass substrate, a dielectric layer directly on the transparent conductor layer, a composite nucleation layer directly upon the dielectric layer, said composite nucleation layer having a thickness of from about 100 to about 500 Angstroms, and a phosphor material directly upon the composite nucleation layer, the improvement wherein said composite nucleation layer comprises a layer of zinc sulfide directly adjacent a layer of strontium sulfide, said layer of zinc sulfide adjacent the dielectric layer and said layer of strontium sulfide adjacent the phosphor material.

* * * * *